United States Patent
Gülsoy

(10) Patent No.: US 11,093,236 B1
(45) Date of Patent: Aug. 17, 2021

(54) SYSTEMS AND METHODS FOR DELIVERING UPDATES TO CLIENT DEVICES

(71) Applicants: Atlassian Pty Ltd., Sydney (AU); Atlassian Inc., San Francisco, CA (US)

(72) Inventor: Kadir Türker Gülsoy, Ankara (TR)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 0 days.

(21) Appl. No.: 16/830,398

(22) Filed: Mar. 26, 2020

(51) Int. Cl.
G06F 8/656 (2018.01)
G06F 8/658 (2018.01)
H04L 29/08 (2006.01)

(52) U.S. Cl.
CPC .............. G06F 8/656 (2018.02); G06F 8/658 (2018.02); H04L 67/34 (2013.01)

(58) Field of Classification Search
None
See application file for complete search history.

(56) References Cited

U.S. PATENT DOCUMENTS

| | | | | |
|---|---|---|---|---|
| 2009/0327398 A1* | 12/2009 | Campbell | ............... | H04L 63/08 709/202 |
| 2013/0036412 A1* | 2/2013 | Birtwhistle | ............... | G06F 8/65 717/171 |
| 2013/0347094 A1* | 12/2013 | Bettini | ............... | G06F 21/577 726/11 |
| 2014/0237465 A1* | 8/2014 | Lin | ............. | G06F 8/656 717/173 |
| 2015/0081837 A1* | 3/2015 | Bernier | ............ | H04W 4/50 709/217 |
| 2015/0082296 A1* | 3/2015 | Thomas | ............ | G06F 8/62 717/171 |
| 2015/0317145 A1* | 11/2015 | Katariya | ............. | G06Q 10/10 717/173 |
| 2015/0317151 A1* | 11/2015 | Falcy | ............. | G06F 21/10 717/173 |
| 2016/0188317 A1* | 6/2016 | Hilliar | ............ | H04W 4/50 717/172 |
| 2017/0134387 A1* | 5/2017 | Storm | ............. | H04L 63/0807 |
| 2017/0249135 A1* | 8/2017 | Gandhi | ............. | H04L 67/125 |
| 2017/0339221 A1* | 11/2017 | Wang | ............. | H04L 67/1014 |
| 2018/0039493 A1* | 2/2018 | Aiglstorfer | ............ | H04L 67/10 |
| 2018/0219974 A1* | 8/2018 | Kakaraparthi | ........... | H04L 67/10 |
| 2020/0125468 A1* | 4/2020 | Peddibhotla | ........ | G06F 16/2448 |

* cited by examiner

*Primary Examiner* — Daxin Wu
(74) *Attorney, Agent, or Firm* — Brownstein Hyatt Farber Schreck, LLP

(57) ABSTRACT

Systems, methods and non-transitory computer readable media for receiving a real time update generated on a server computing device at a client device are disclosed. The method includes: receiving, from a synchronization system that is independent of the server computing device, an update notification at the client device, the update notification comprising a unique identifier of an item associated with the update; generating and forwarding an update data request to the server computing device, the update data request comprising the unique identifier of the item associated with the update and a unique identifier of a user associated with the client device; and receiving update data associated with the update from the server computing device and updating a user interface of the client device to display a graphical output associated with the update.

20 Claims, 6 Drawing Sheets

US 11,093,236 B1

SYSTEMS AND METHODS FOR DELIVERING UPDATES TO CLIENT DEVICES

TECHNICAL FIELD

The present disclosure is directed to client-server applications and more particularly to providing updates in client-server applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In general, in a client-server architecture, when a client device requires access to content hosted by the server in order to display the content, the client device sends a content request to the server. The server in turn identifies the requested content and forwards it to the client device. The client device can then render the content for display on a display of the client device. The systems and techniques described herein are applicable for enabling display of dynamic and static content on a client device.

Figure 1:
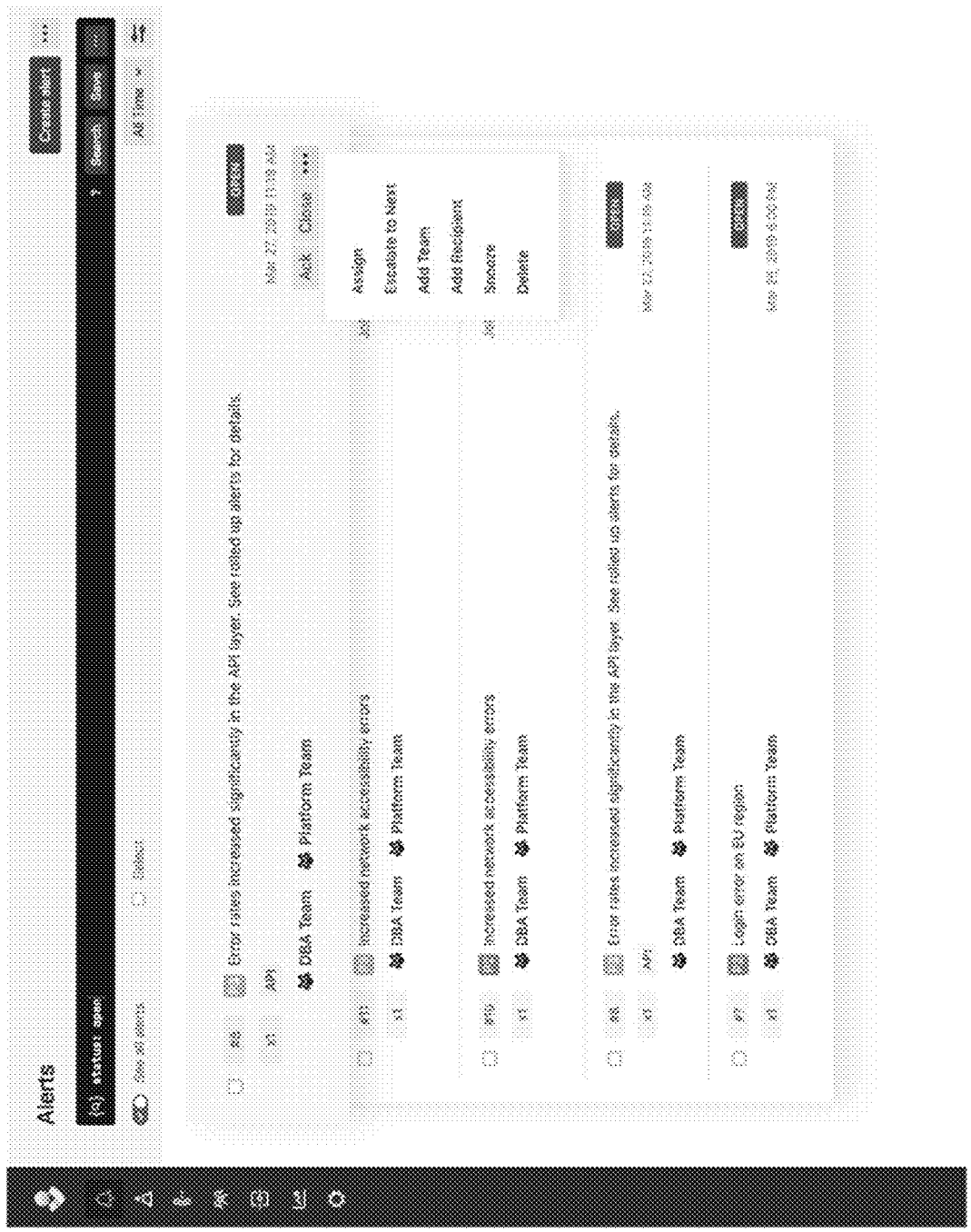
FIG. 1 is an example user interface showing dynamic content.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description, numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

Generally, in a client-server architecture, when a client device requires access content hosted by the server and to be displayed on the client device, the client device sends a content request to the server. The server in turn identifies the requested content and forwards it to the client device. The client device can then render the content for display on a display of the client device. In some cases, this content may be generally static (e.g., content displayed on a Wikipedia page) that does not change while the page is being accessed. In other cases, the content may be dynamic (e.g., Forex share prices displayed on a webpage) that can change multiple times while the webpage is being accessed/displayed on the client device.

In some cases, it is relatively easy to communicate static data to the client—the client requests the content once e.g., when a webpage is opened or refreshed. However, communicating dynamically changing content from a server to a client may involve more complexity.

Overview

As used in this disclosure, an update refers to a change in an original piece of content. The change could be addition of new content in the original content, deletion of a portion of the original content, or amendments to one or more portions of the original content. Further, the piece of content can be any type of content—e.g., an entire document, a webpage, a particular portion of a webpage, one or more individual and/or independent pieces of information such as individual share prices, alerts in an incident management system, tickets/issues in an issue tracking system, etc. In case the update represents changes to independent pieces of information, the change could de deletion of the piece of information, addition of a new piece of information or amendments to an existing piece of information.

As described previously, communicating updates from the server to the client can involve complexity. There are two common ways in which this can be accomplished—client pull or server push.

In the client pull technique, the client polls the server for updates at regular intervals (e.g., every few seconds or minutes). If updates are available, these are communicated to the client, which renders the updated content on the client display. This technique may be beneficial in situations where content is updated on the server at regular intervals or at a low frequency. For example, consider the situation where content is updated on the server every 5 seconds. In such cases, if the client polls the server every 5 seconds, it would be provided with updated data each time it polls the server. However, this technique can be unnecessarily resource intensive in cases where updates are sporadic. For example, consider the situation where content is not updated for hours sometimes, but then updated multiple times in quick succession. If a client polls the server every 5 seconds in this situation, it may result in the client sending multiple queries to the server in an hour without receiving any updates and therefore result in wastage of network and server resources. Alternatively, if the client polls the server every hour, it may reduce network and server resource usage, but it may also result in the client missing important updates in between polls. Further, although client pulling may not put a high load on server and network resources in cases were the server services a small number of clients, the server and network loads may be very high in cases where the server services thousands if not hundreds of thousands of active clients at any given time and the clients poll the server every few seconds.

The other technique, server push, often utilizes web sockets. A web socket is a persistent connection between a client and a server that provides a full-duplex communication channel between the client and server. Using a web socket, the server and client can send messages to each other at any time. The connection is established only once at the beginning, and after that, there is an open channel for sending and receiving data. This is an entirely different technique than client pulling, where to get data, the client has to request it, and then a connection is broken soon after. Although web sockets allow the server to send updates to the client in real time, the most significant disadvantage of using web sockets is that it keeps the connection open on the server for the whole duration of the time the client is interacting with the server. This can consume large amounts of server resources and can be rather expensive. For example, consider the situation where a server is simultaneously serving 500 clients. In this situation, the server maintains 500 active web sockets—this can seriously affect the performance of the server.

Accordingly, there are some issues with currently available techniques for providing real-time or near real-time server updates to client devices. To address one or more of these issues, the present disclosure provides a new network architecture for providing updates to client devices. In particular, the present disclosure utilizes an intermediate synchronization system operatively connected between the server and the client. When content is updated on the server, the server communicates an update notification to the intermediate synchronization system. The intermediate synchronization system in turn communicates this notification to client devices connected to the intermediate synchronization system. In response to receiving this notification, client devices can query the server for the update. In this manner, updates can be communicated to the clients in real-time or near real-time (e.g., within a few seconds).

In certain embodiments, the server may push update notifications to the intermediate synchronization system using a one-way publish-subscribe model. In other embodiments, the synchronization system may utilize a pulling technique to pull updates from the server. Further, in some embodiments, the connection between the synchronization system and the client devices may be via web sockets. In this manner, the server only needs to provide update notifications to the intermediate synchronization system. The intermediate synchronization system in turn is responsible for maintaining web socket connections with the clients and communicating the notifications to the clients. Therefore, the costs associated with maintaining expensive web sockets is transferred to the synchronization system. Further, the clients can query the server for updates only when required (instead of a regular basis), thereby reducing server loads and network bandwidth usage.

Further still, by providing an update notification to the synchronization system instead of providing the entire content related to the update, the presently disclosed systems and methods maintain data security as the content is not shared with any third party systems or transmitted over open communication networks. The intermediate synchronization system may forward the update identifier to the clients, which utilize this identifier to query the server for updated data related to the identifier. In this manner, content (which might be confidential) is not revealed to the intermediate synchronization system at all. It is only revealed to clients that are authorized to view the content.

These and other aspects and technical advantages of the present disclosure are described in detail in the following sections with reference to a particular example software application—an incident management application. However, it will be appreciated that this is merely an example and that the teachings of the present disclosure can be implemented on any client-server application that includes dynamically updating content without departing from the scope of the present disclosure.

One incident management application is Opsgenie (offered by Atlassian, Inc.). Opsgenie is a dedicated incident management platform that can be integrated with one or more monitoring tools to provide a single interface for dealing with issues/incidents detected by the integrated monitoring tools. Opsgenie includes a backend server that is connected to the monitoring tools for receiving notifications from these tools. The server generates and/or manages alerts based on the received notifications. Further, Opsgenie includes a frontend client that provides status of the alerts and allows users to manage the alerts. For instance, the front end allows users to perform certain actions on the alerts including, assigning an alert to a specific support engineer, changing a priority level of an alert, deleting an alert, commenting on an alert, creating an alert, etc. In addition to these features, Opsgenie is also configured to notify relevant support engineers when an issue/incident is detected.

FIG. 1 illustrates an example user interface 100 rendered by an Opsgenie client. As shown in this example, the user interface displays a number of "open" alerts—i.e., alerts that have been created but have not yet been resolved. The alerts may be automatically generated by the Opsgenie server in response to receiving notifications from monitoring systems. Alternatively, alerts may be manually created by users via the user interface 100. A user reviewing this list of alerts may commence working on one or more of these alerts to resolve the underlying issue. However, sometimes, multiple users may be viewing and working on the same alert (e.g., if it is high priority alert or affects a large number of customers). In this case, if one of the other users (e.g., Bob) resolves the issue associated with one of the alerts in user interface 100, Bob may notify Opsgenie, e.g., by changing the status of the alert from "open" to "resolved" or "closed" via the user interface 100. Typically, this change in status is communicated from Bob's Opsgenie client to the server so that anybody who accesses that alert from the server can see that the alert status has been changed.

However, in case another user (e.g., Alice) had already opened the user interface 100 on her client device when the status of the alert was "open" and has failed to refresh the user interface, Alice would not be able to see the updated status of the alert and may continue to spend time resolving the issue because Alice is not aware that the issue has already been resolved. Aspects of the present disclosure provide a mechanism whereby the user interface 100 can be updated in real-time or near real-time to show updates without requiring Alice to reopen or refresh the user interface.

Networked Environment

Figure 2:
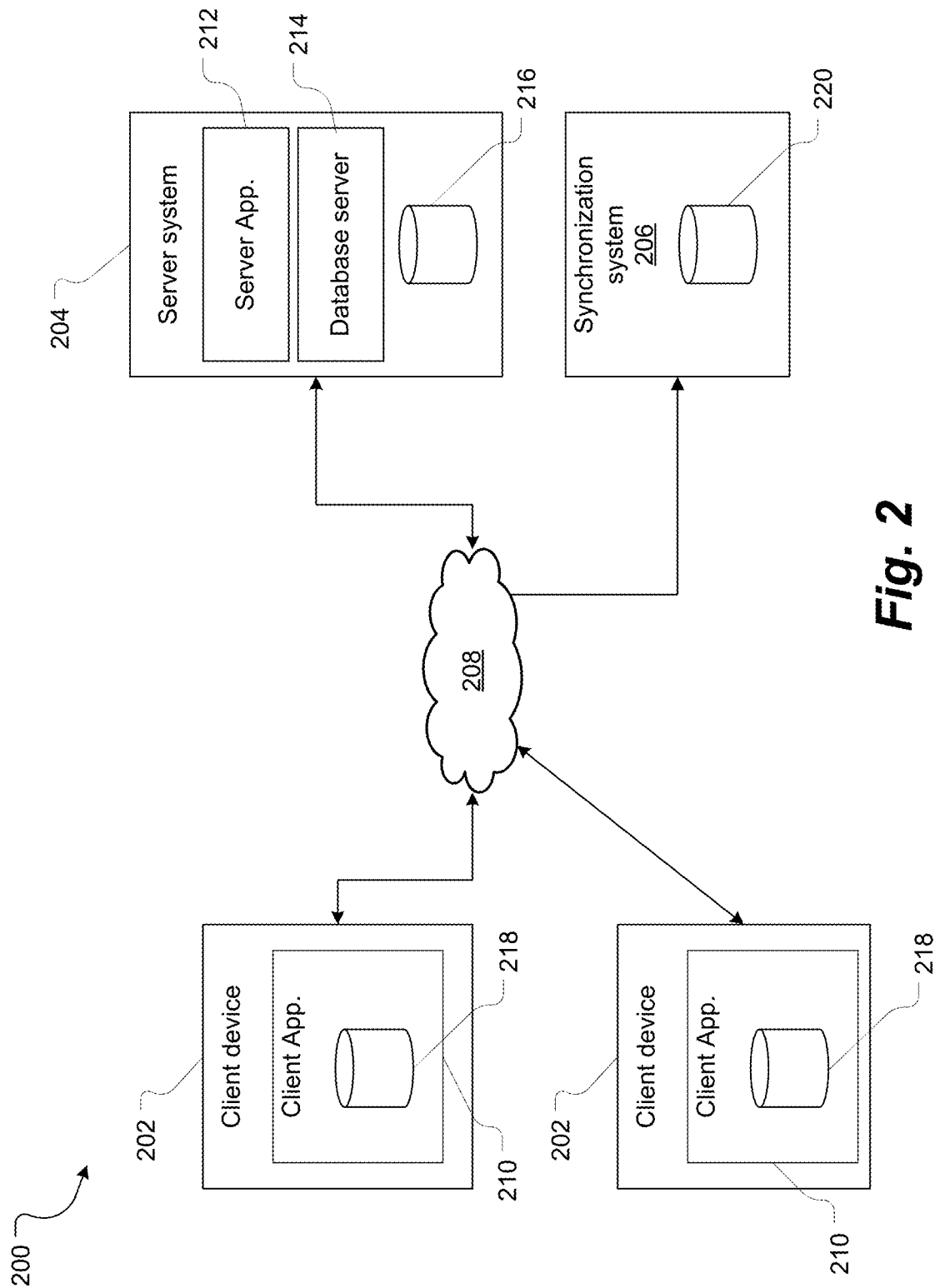
FIG. 2 is a diagram depicting a networked environment in which various features of the present disclosure may be implemented.

FIG. 2 depicts one example of a networked environment 200 in which the various operations and techniques described herein can be performed. In particular, FIG. 2 illustrates the systems and platforms that may be utilized to provide updates to clients. The Networked environment 200 includes client devices 202, a server system 204, and an intermediate synchronization system 206 which communicate via one or more communications networks 208 (e.g. the Internet).

The server system 204 is a system entity that hosts one or more server applications 212. The server application 212 is executed by the server system 204 to configure it to provide server-side functionality to one or more corresponding client applications (e.g. 210 Examples of server applications 212 hosted by the server system 204 include incident management applications (e.g., Opsgenie™), interactive chat applications (e.g., Slack™), collaborative applications (e.g., Confluence™), software code management systems (e.g., Bitbucket™), and issue tracking applications (e.g., Jira™). Opsgenie, Jira, Confluence, and BitBucket, are offered by Atlassian, Inc. It will be appreciated that these software applications are merely exemplary and that the server system 204 can host any other product application without departing from the scope of the present disclosure.

In order to function, the server application 212 comprises one or more application programs, libraries, APIs or other software elements that implement the features and functions that are described herein. For example, in case the server application 212 is an incident management application such as Opsgenie, the server application 212 may include programs to receive notifications from one or more monitoring tools (not shown) integrated with the incident management application, generate and manage alerts corresponding to the received notifications, authenticate users, notify on-call support engineers when alerts are generated, and receive updates from client devices 202. In addition, the server application 212 may be configured to communicate update notifications to the synchronization system 206 and service update requests from the client devices 202.

The server system 204 may be a web server (for interacting with web browser clients), a mobile web server (for interacting with mobile clients), or an application server (for interacting with dedicated client applications) or may be a combination server that includes web server, mobile web server, and application server module. Examples of web servers include Apache, IIS, nginx, GWS, etc.

In the present example, the server system 204 also includes a database server 214. Database server 214 provides access to one or more databases 216, which store content relevant to the services being offered by the server 204. In the example of an incident management application, such content may include, for example, data related to alerts generated and managed by the server system 204, data related to users/clients registered to utilize the server system 204, etc. Further, the database 216 may include a database of on-call schedules of support engineers and a database maintaining permissions, etc.

While the server system 204 is depicted and described as a single server machine, alternative architectures are possible. For example, in certain cases a clustered server architecture may be used where multiple server computing instances (or nodes) are instantiated on one or more computer processing systems to meet system demand. Conversely, in the case of small enterprises with relatively simple requirements the server system 204 may be a stand-alone implementation (i.e. a single computer directly accessed/used by end users). Server system 204 has been illustrated as a single system.

The synchronization system 206 provides mechanisms for receiving update notifications from the server system 204 and communicating these to the client devices 202. In addition, the synchronization system 206 may be configured to maintain persistent communication channels between itself and the client devices 202. In one example, these communication channels may be web sockets. Further, in one example, the synchronization system 206 may be the application development service, AppSync™ offered by Amazon and hosted in the Amazon Web Services (AWS) public cloud. Appsync allows application providers to synchronize data for mobile and web applications in real time. Typically, application providers synchronize their databases with Appsync (i.e., either databases provided by AWS or by third parties). Then, client devices can "subscribe" to certain changes made to the databases via Appsync and each time these changes are made in the database, Appsync can propagate the changes to the connected client devices.

In the embodiments disclosed in the present disclosure, however, the database server 214 is not synchronized with the synchronization system 206. Instead, the server application 212 communicates update notifications to the synchronization system 206. The synchronization system 206 is simply configured to maintain communication channels with the client devices and forward these update notifications to the connected client devices 202. When a notification is received, the synchronization system 206 identifies the client devices to which the notification needs to be communicated and pushes the update to the identified clients. Further, the synchronization system 206 maintains a database or cache 220 for receiving and storing update notifications from the server application 212. This notification database/cache 220 can be populated each time a new update notification is pushed to the synchronization system 206. Further, the notification database/cache 220 may be configured to automatically delete older entries (e.g., update notifications received a threshold period of time ago, or update notifications that have already been pushed to clients).

The client device 202 hosts a client application 210 which, when executed by the client device 202, configures the client device 202 to provide client-side functionality/interact with the server system 204 (or, more specifically, server application 212 running thereon). The client application 210 may be a general web browser application (such as Chrome, Safari, Internet Explorer, Opera, or an alternative web browser application) which accesses the server application 212 via an appropriate uniform resource locator (URL) and communicates with the server application 212 via general world-wide-web protocols (e.g. http, https, ftp). Alternatively, the client application 210 may be a specific application programmed to communicate with server application 212 using defined application programming interface (API) calls. A given client device 202 may have more than one client application 210, for example both a general web browser application and a dedicated programmatic client application.

When the server application 212 is an incident management application such as Opsgenie, the client application 210 is configured to perform client-side Opsgenie functionality including—e.g., communicating with the Opsgenie server application 212 to receive information about alerts relevant to a user of the client device 202, communicate with the synchronization system 206 to initiate a connection, and communicate with the server application 212 to receive content for updates of alerts displayed on the client device 202. The client application 210 may also be configured to receive user input to update alerts and/or perform searches for one or more alerts.

In some embodiments, the client application 210 may also maintain a display cache 218. The display cache 218 stores data related to content (e.g., alerts) currently displayed on a user interface (e.g., UI 100) rendered by the client application 210.

The client device 202 may be any form of computing device. Typically, client device 202 is a personal computing device—e.g. a desktop computer, laptop computer, tablet computer, and in some instances even a mobile phone. While only two client devices 202 have been illustrated, an environment would typically include multiple client devices 202 used by users to interact with the server system 204.

The client device 202, synchronization system 206, and server system 204 communicate data between each other either directly or indirectly through one or more communications networks 208. Communications network 208 may comprise a local area network (LAN), a public network, or a combination of networks.

Computer Processing System

Various embodiments and features of the present disclosure are implemented using one or more computer processing systems.

Figure 3:
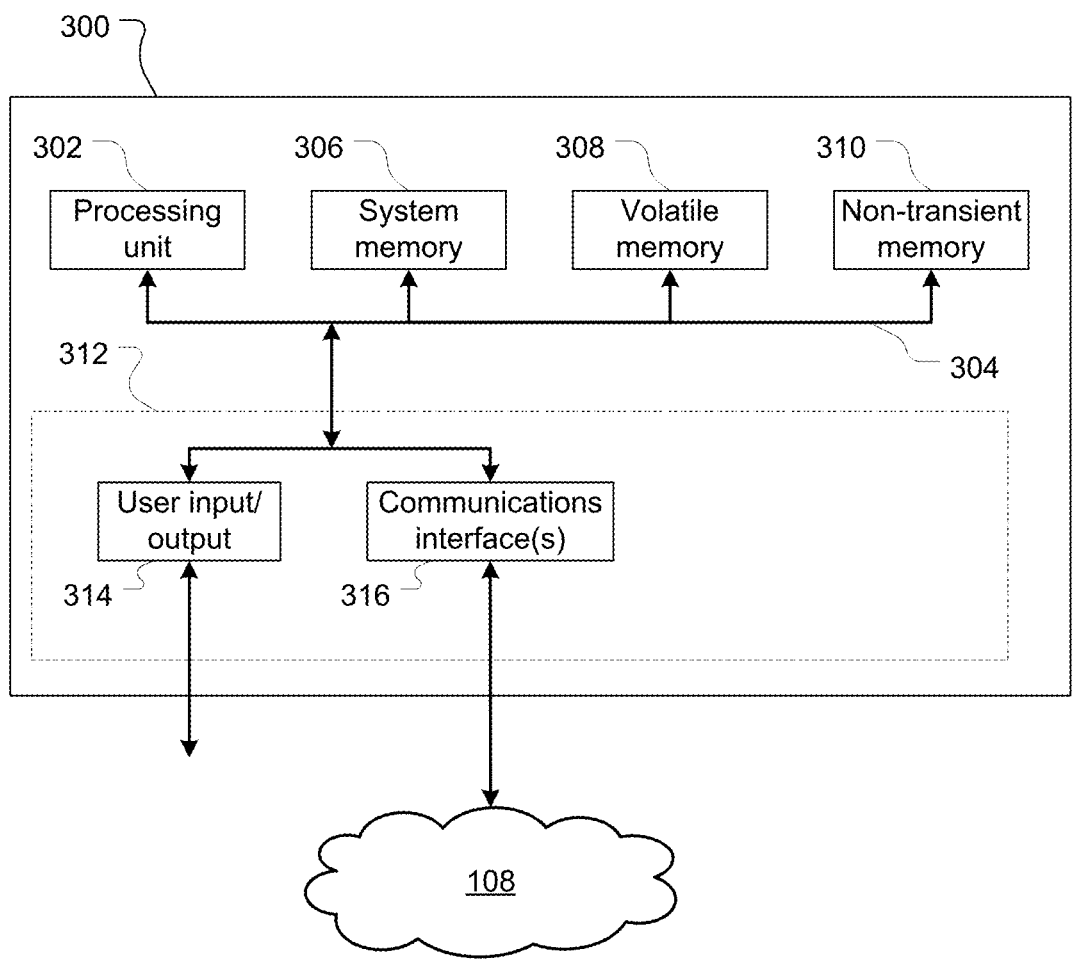
FIG. 3 is a block diagram of a computer processing system configurable to perform various features of the present disclosure.

FIG. 3 provides a block diagram of a computer processing system 300 configurable to implement embodiments and/or features described herein. System 300 is a general-purpose computer processing system. It will be appreciated that FIG. 3 does not illustrate all functional or physical components of a computer processing system. For example, no power supply or power supply interface has been depicted, however system 300 either carries a power supply or is configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances all processing will be performed by processing unit 302, however in other instances processing may also be performed by remote processing devices accessible and useable (either in a shared or dedicated manner) by the system 300.

Through a communications bus 304 the processing unit 302 is in data communication with a one or more machine-readable storage (memory) devices, which store instructions and/or data for controlling operation of the processing system 300. In this example system 300 includes a system memory 306 (e.g. a BIOS), volatile memory 308 (e.g. random access memory such as one or more DRAM modules), and non-volatile memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 300 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 300 connects—whether by wired or wireless means—include one or more input devices to allow data to be input into/received by system 300 for processing by the processing unit 302, and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads, microphones, accelerometers, proximity sensors, GPS devices, and the like. System 300 may also include or connect to one or more output devices controlled by system 300 to output information. Such output devices may include devices such as a CRT displays, LCD displays, LED displays, plasma displays, touch screen displays, speakers, vibration modules, LEDs/other lights, and such like. For output devices that include a display or display device, the system 300 may be adapted to produce graphical output associated with a graphical user interface, an update, or another element of the embodiments described herein. System 300 may also include or connect to devices which may act as both input and output devices, for example memory devices (hard drives, solid state drives, disk drives, compact flash cards, SD cards and the like) which system 300 can read data from and/or write data to, and touch screen displays which can both display (output) data and receive touch signals (input).

System 300 may also connect to one or more communications networks (e.g. the Internet, a local area network, a wide area network, a personal hotspot etc.) to communicate data to and receive data from networked devices, which may themselves be other computer processing systems.

System 300 may be any suitable computer processing system such as, by way of non-limiting example, a server computer system, a desktop computer, a laptop computer, a netbook computer, a tablet computing device, a mobile/smart phone, a personal digital assistant, a personal media player, a set-top box, a games console.

Typically, system 300 will include at least user input and output devices 314 and a communications interface 316 for communication with a network such as network 208 of environment 200.

System 300 stores or has access to computer applications (also referred to as software or programs)—i.e. computer readable instructions and data which, when executed by the processing unit 302, configure system 300 to receive, process, and output data. Instructions and data can be stored on non-transient machine-readable medium accessible to system 300. For example, instructions and data may be stored on non-transient memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows®, Apple OSX, Apple IOS, Android, Unix, or Linux.

System 300 also stores or has access to applications which, when executed by the processing unit 302, configure system 300 to perform various computer-implemented processing operations described herein. For example, and referring to the networked environment of FIG. 2 above, client device 202 includes a client application 210 which configures the client device 202 to perform the described client device operations, and server system 204 includes a server application 212 which configures the server system 204 to perform the described server system operations.

In some cases, part or all of a given computer-implemented method will be performed by system 300 itself, while in other cases processing may be performed by other devices in data communication with system 300.

Example Update Process

Figure 4:
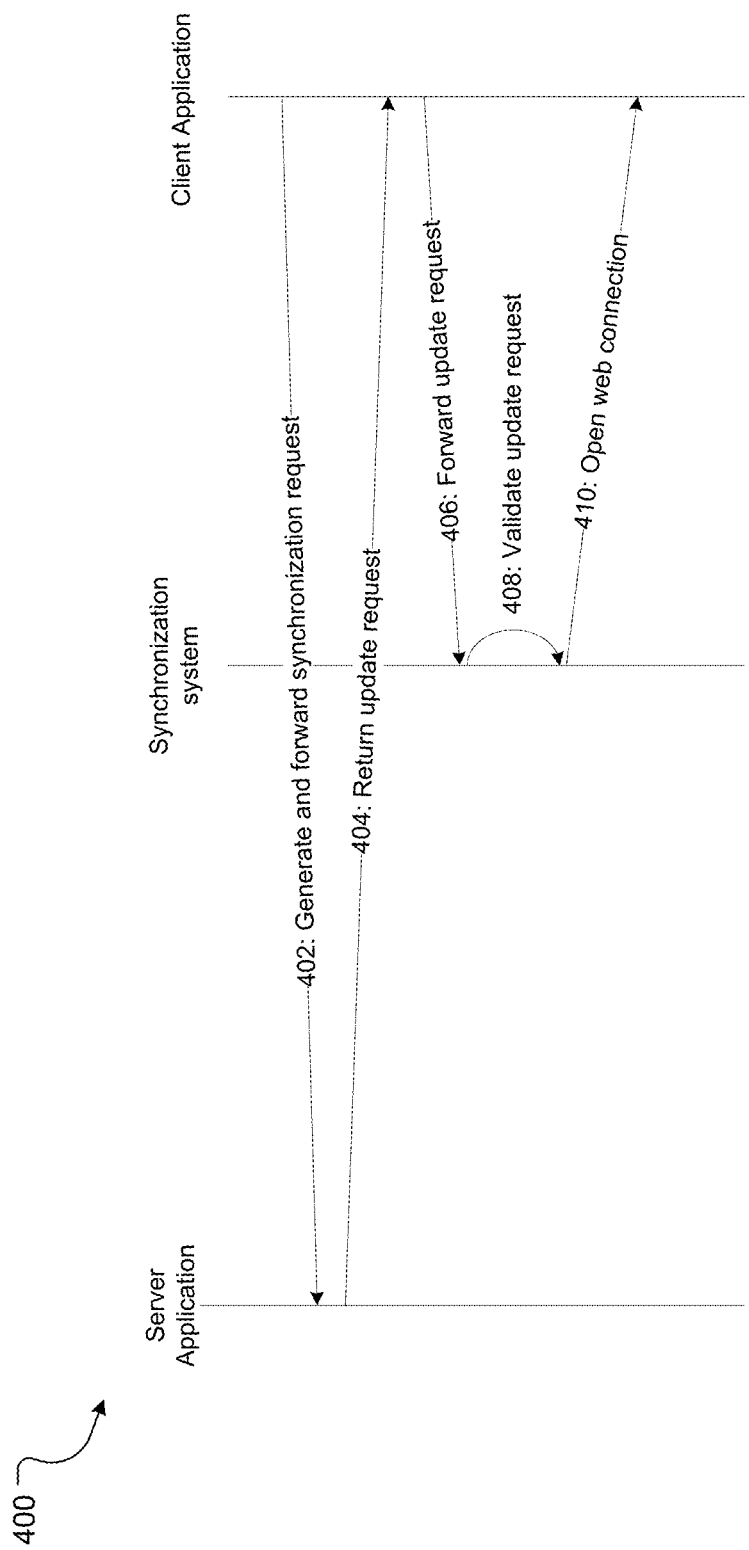
FIG. 4 is a message-passing diagram illustrating an example method for setting up a connection between a client device and a synchronization system.

This section describes a computer-implemented method for communicating updates to clients from a server application. The method will be described with reference to the message passing diagrams of FIGS. 4 and 5, which illustrate processing performed by the server application 212, the synchronization system 206 and the client application 210. In particular, method 400 depicts method steps performed by the various systems to establish a connection between the client application 210 and the synchronization system 206 whereas message passing diagram 500 depicts the method steps performed by the various systems to communicate an update notification from the server application 212 to the client application 210. Further, FIG. 6 is a flowchart illustrating an example method performed by the client application 210 upon receiving an update notification from the synchronization system 206.

To prevent any user from impersonating a registered user of the server application 212 and subsequently connecting with the synchronization system 206, aspects of the present disclosure adopt an authentication and authorization process to authenticate and authorize the client application 210 before a connection can be established between the client application 210 and the synchronization system 206. A number of different authentication/authorization techniques may be employed, including, e.g., OpenID Connect (OIDC), or AWS Identity and Access Management (IAM).

OIDC is an authentication protocol, based on the Open Authorization (OAuth) 2.0 family of specifications. It uses JSON Web Tokens (JWT) as access tokens and/or identity tokens to authenticate and often authorize a particular user/application to perform actions. Access tokens are credentials that can be used by the client application 210 to access the synchronization system 206. JWT ID tokens typically contain identity data and include three parts: a header, a body, and a signature. The header contains metadata about the type of token and the cryptographic algorithm used to secure its contents. The body includes one or more claims that are verifiable security statements, such as the identity of the user and the permissions they are allowed. The signature is used to validate that the token is trustworthy and has not been tampered with. The signature may be created by taking the header and payload along with a secret and signing this with the cryptographic algorithm specified in the header. Receivers of the identity token can then verify/validate that the token has been generated by the correct signing party, e.g., by decrypting the signature using a public key of the signing party.

In certain embodiments, method 400 may utilize this OIDC authentication protocol to authenticate the user before the synchronization system 106 can establish a connection with the client application 210. The method commences at step 402, where the client application 210 generates a request for connecting with the synchronization system 206 and forwards this request to the server application 212. In some embodiments, this request may be generated each time a user opens the client application 210 on their client device 202 and/or provides their user credentials to log into the application hosted by the server application 212 (e.g., by providing their username and password to access the server application 212). The request for connecting to the synchronization system 206 may include an access token that is signed by the private key of the server application 212.

Next, at step 404, if the server application 212 determines that the user accessing the server application 210 is authenticated (e.g., because the user has successfully logged in), it generates and forwards an update request to the client application 210. The update request may include an identity token for the user authenticated by the server application. Further, the request may include a universal resource locator (URL) of the synchronization system 206. This URL indicates the endpoint of the synchronization system 206 to which the update request needs to be submitted. In addition, the update request may include a query for requesting real-time updates. It will be appreciated that the server application 212 can configure this query to include any data that the server application wishes to be pushed to the client application 210 by the synchronization system 206. In one embodiment, it can include instructions to allow the synchronization system 206 to push all update notifications communicated by the server application 212 to the client application. In other embodiments, it can include instructions to allow the synchronization system 206 to push only update notifications communicated by the server application 212 that are relevant to the user associated with the client application 210.

In one embodiment, the synchronization system may utilized the REST protocol for receiving and responding to queries. Alternatively, the synchronization system 206 may utilize a GraphQL specification for receiving queries and responding to such queries. In case GraphQL is used, the query can be in the form of a "subscription" query. GraphQL subscriptions are a way to push data from the synchronization system 206 to the client applications 210 that choose to subscribe or listen to real-time update notifications from the synchronization system 206. Subscription queries are similar to regular queries in that they specify a set of fields to be delivered to the client application 210, but instead of immediately returning a single response, a response/result is sent every time a particular update notification is available at the synchronization system 206. Further, the identity token that forms part of the update request may be in the form of a JWT and the body of the JWT can include an identifier of the user as a custom claim.

An example of the update request is shown in table A below.

{
"headers": {
"Authorization":
"eyJraWQiOiJOa1JDTkRsR05rVkJSVGRHTmtORk5EZ
zJOelF5UWtNeVJVSTN
Sa0V6T1RORk56RTVSVUV5TkEiLCJ0eXAiOiJKV
1QiLCJhbGciOUSUzI1NiJ9.eyJzdWIiOJ6ZHR1Ynp
pdU9yRWwySXAxTW5mVENERnpjR3VNTG4w
Y0Bj bGllbnRzIiwiY3J1YXRlZCI6MTU2OTQ5NjkwOD
A1OSwiY3VzdG9tZXJJZCI6ImI1NmZhODVlLTIw
MjktNDcyYS1hMDExLTNkNTQ0YzZmMjM4NCIs
Imlzc
yI6Imh0dHBzOi8vYXBwc3luY3Rlc3Rmb3Jsb2Nhb
C5zMy11cy13ZXN0LTIuY
W1hem9uYXdzLmNvbS8iLCJleHAiOjE1NzAzNjA
5MDgwNTksImlhdCI6MTU
2OTQ5NjkwODA1OX0.pyGovIlYiL4OujshmAVI7
QIOhXvpl7w2I8eoWYMO-
80BJwV_J_m8JkYpHgngQb2VD_dHfoCiv7h_FaT
BMVMrbvnJ50W1arJ0IW0j7
1YGeV34TCDF4mSUuL_EoVMa3aos5LYfm4Q8Ie
Shere-MHIxBCNIndlTS-U0Mujs8jG-OBUz_ohhcg-
5Jvx1NH9QLSe2_bBEAd51utmvNuS-
VSMKv4vWojwyvhQof2p4HwRE6gKHH7GVx5S
NKUrd18sR5BIItayGkzotYY
PZvCusBCqlXrD_oKlV1IA4hKpaPnC8IgSZypDdj
OM8L1b3I9BdSW5h8SDJkU b0dqINMtgxphaoWg"
},
"syncsystemUrl": "https:// n6gizfg7qjegxpble7wbmztnbq.syncsystem-api.us-west-2.amazonaws.com/graphq1",
"payload": {
"query": "subscription subscribeUpdateNotifications {\n updatenotification(userId:\"b56fa85e-2029-472a-a011-3d544c6f2384\") {\n userId\n\t\talertId\n action\n}\n}"
}
}

Table A: Example Update Request

As shown in this table, "authorization" includes an identity token for the user associated with the client application 210. This identity token includes a header, a body and a signature of the server application 212 (each separated by a dot) and can be used by the synchronization system 206 to validate this update request. The payload includes a subscription query. In this example, the subscription query instructs the synchronization system 206 to push any update notifications available at the synchronization system 206 that includes the identifier of the user associated with the client application to the corresponding client application 210.

Next, at step 406, once the client application 210 receives the update request from the server application 212, it forwards the update request to the synchronization system 206. In one embodiment, the client application 210 forwards the update request to the URL received in the update request from the server application 212. To that end, the client application retrieves the URL from the update request, amends the update request to remove the URL, and forwards the amended update request to the URL.

At step 408, the synchronization system 206 validates the update request. In particular, the synchronization system 206 may first validate the identity token received as part of the update request. To this end, the synchronization system 206 may retrieve a public key for the server application 212 and utilize this public key to decrypt and validate the authorization portion of the update request. In some embodiments, the server application 212 provides a URL to the synchronization system 206 during registration/setup where the server application's public key is available. The synchronization system 212 can then make a call to this URL and retrieve the server application's public key whenever it is needed. If the identity token cannot be validated or unencrypted, the synchronization system 206 may generate an error message and forward this to the client application 210.

Alternatively, if the synchronization system 206 is able to decrypt and validate the identity token, it may proceed to the next step of validating the update request where the synchronization system 206 compares the decrypted user identifier received as part of the identity token with the user identifier received as part of the query. If there is a mismatch between the two user identifiers, the synchronization system 206 may once again generate an error message and forward this to the client application 210. Alternatively, if the two user identifiers match, the synchronization system 206 determines that the update request is valid and genuine. It can subsequently register the request to receive update notifications from the server application 212 available at the synchronization system 206 and set up a persistent communication channel between the client application 210 and itself. As described previously, in some embodiments, this communication channel may be a web socket.

The method described above utilizes the OIDC protocol for authenticating the user and validating the update request. In other embodiments, any other authentication/authorization protocol may be utilized without departing from the scope of the present disclosure. In case another authentication protocol is utilized, some of the method steps described above may be modified. For example, if the IAM protocol is utilized, the update request may include authentication information instead of the identity token. An example of an update request created using the IAM protocol is shown in table B.

{
"headers": {
"x-amz-date": "20190926T113912Z",
"Authorization": "AWS4-HMAC-SHA256
Credential=AKIARXYVJJFYBW6B6VCN/20190926/ us-west-2/appsync/aws4_request,SignedHeaders=host; x-amz-date,
Signature=f783b46cd7ff02af09791f4682f9c9684e04c f08c6853ea87ad5af62a 120ffc0"
},
"SyncsystemUrl": "https:// n6gizfg7qjegxpble7wbmztnbq.syncsystem-api.us-west-2.amazonaws.com/graphq1",
"payload": {
"query": "subscription subscribeAlertActions {\n alert (userID:\"b56fa85e-2029-472a-a011-3d544c6f2384\") {\n userID\n\t\talertId\n action\n}\n}"
}
}

Table B: Example Update Request

As shown in this example, the authorization field is different from the example shown in table A and includes the algorithm used for creating the authentication information (AWS4-HMAC-SHA256, in this example), credential scope (which includes a public access key identifier for accessing the synchronization system 206. The access key is unique to the particular user and synchronization system 206, list of signed headers, and a calculated signature. This signature may be based on the information in the request and is generated using a secret access key of the server application 212. The signature is used to confirm the identity of the user and the identity of the server application that generated the request to the synchronization system 206.

At the synchronization system 206 when the update request is received, it validates the request using the signature in the authorization field. If the request can be validated, the synchronization system 206 registers the update request and sets up a communication channel between the client application and itself. This communication channel or web socket may be maintained until the client application remains open on the client device 202. Once the client application is closed, the communication channel may be disconnected and the process described with reference to FIG. 4 may be performed when the client application is reopened.

Once a communication channel is setup in this manner and the update request is registered with the synchronization system, update notifications may be pushed to the client application 210 each time relevant updates are received at the synchronization system from the server application 212.

Figure 5:
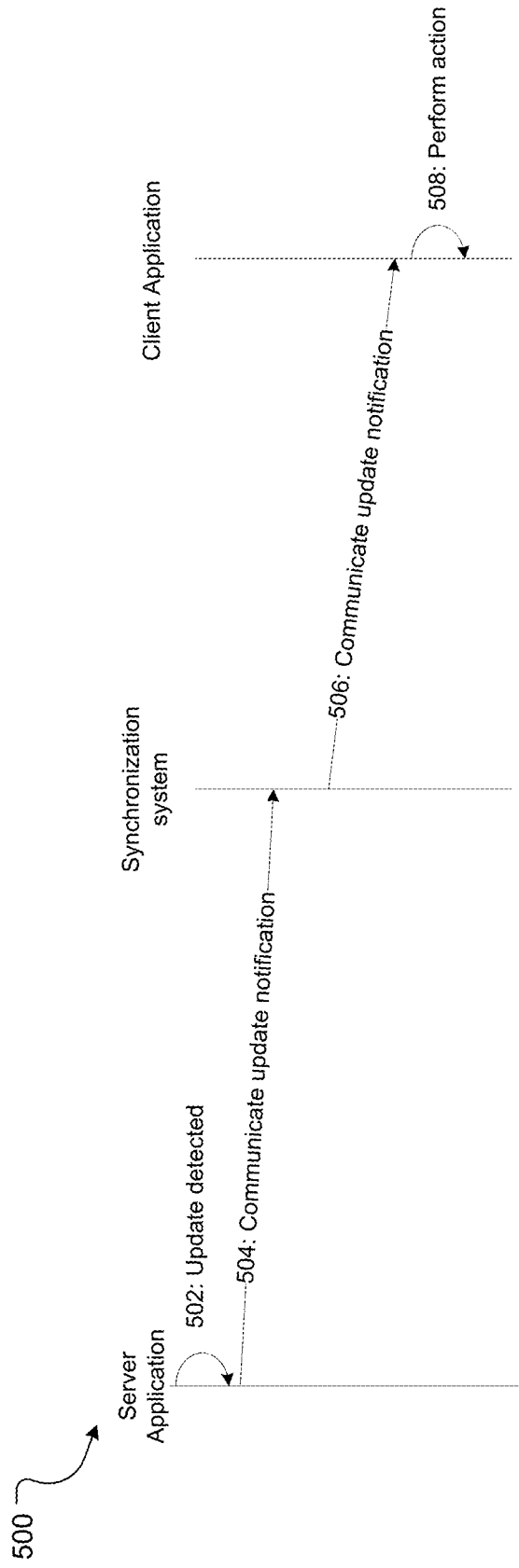
FIG. 5 is a message-passing diagram illustrating an example method for communicating update notifications from a server application to a client application.
Figure 6:
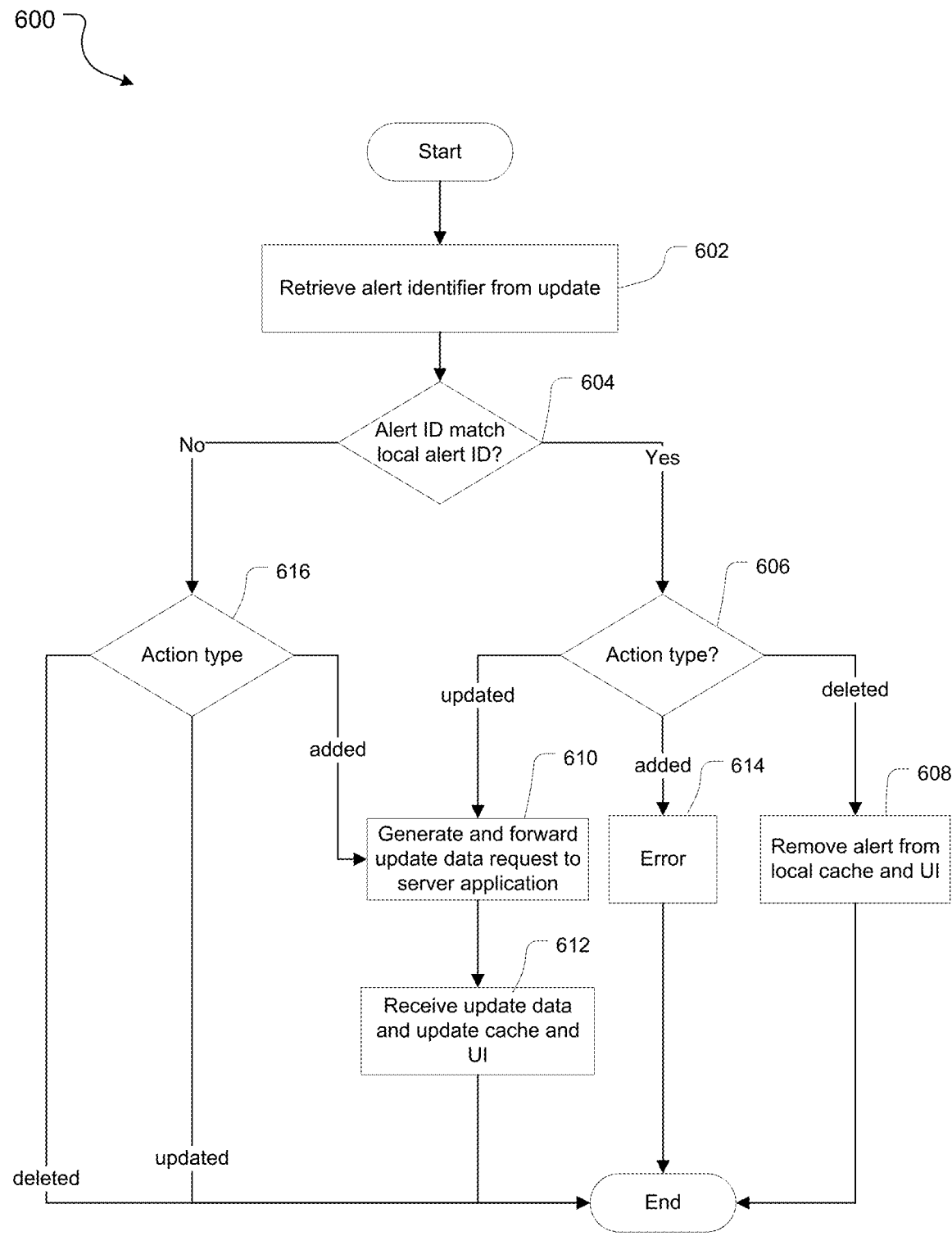
FIG. 6 is a flowchart illustrating an example method performed by a client device in response to receiving an update notification.

FIG. 5 illustrates an example process 500 for communicating an update to a client application 210. It will be appreciated that for simplicity this method describes the process for communicating a single update to a single client application. However, in reality, a single update may be communicated to multiple client applications. Further, multiple updates may be communicated to multiple client applications and this process can simply be repeated for multiple updates.

The process 500 is described with reference to an incident management system where the content displayed on the client application may include one or more alerts generated by the incident management system. Further, updates in this context may include creation of a new alert (e.g., if a new incident is detected), deletion of an existing alert (e.g., if the alert had been resolved), or a change in the status of an existing alert (e.g., a change in the status of an alert from open to assigned).

The process commences at step 502, where an update is available at the server application 212. As previously noted, the update may be the addition, deletion, or change of an alert. In some embodiments, the server application 212 may be directly responsible for generating the update (e.g., because it has automatically created a new alert based on notifications received from one or more external sources). In other cases, the server application 212 may receive the update from one or more client applications 210 (e.g., because a user acknowledges an alert, which changes its status, or because a user deletes an alert).

In any case, once an update is available at the server application 212, the server application 212 generates an update notification associated with the update and pushes the update notification to the synchronization system 206 at step 504. In one embodiment, the update notification may include a unique identifier of the update. In addition to this, the update information may also include a customer identifier (uniquely identifying the tenant) and/or a user identifier uniquely identifying the users that are authorized to receive the update. Optionally, the update notification may also include an identifier of the type of update (e.g., whether it is an alert, an incident, a status page update, an escalation, a heartbeat, etc.), and an identifier of the type of update (e.g. if is an alert creation, alert deletion or alert status change event).

When the synchronization system 206 utilizes the GraphQL specification, the update notification (whether it may be an alert creation notification or an alert update notification) may be sent to the synchronization system 206 in the form of a mutation. One example of a mutation indicating an alert update notification may be as follows—

{updateAlert(customerId: "87d9ad11-ef92-4032-9f13-3a6af9aa750e", id: "59cf89ae-1844-4d18-99a0-c9024673f738", action: "create") {customerId id action} }.

Alternatively, if the REST mechanism is utilized, the update information may be sent in the form of a POST message. The synchronization system 206 may temporarily store the update notification in the notification database/cache 220 once it is received.

Next, the synchronization system 206 pushes the update notification to one or more active client applications 210 connected to the synchronization system 206. In certain embodiments, the synchronization system 206 may compare the user identifier received in the update notification with the user identifiers of the client applications 210 connected to the synchronization system. If the user identifier received in the update matches the user identifier of one or more of the client applications 210, the synchronization system 206 forwards the update to the corresponding client application 210.

In one example, the update notification forwarded to the client application 210 may include the alert identifier, and an action type. In other examples, the update notification may also include an alert type.

At step 508, the client application 210 performs an action based on the received update. Generally speaking, as previously described, the client application 210 maintains a display cache 218 of the alerts currently displayed via the client application. This cache may include, e.g., the unique identifier of each displayed alert, a status of the alert, an alert type, etc. As new alerts are added or deleted, the display cache 218 is correspondingly updated. Depending on whether the update notification relates to an alert currently displayed on the client device 202 or not the client application 210 perform one or the other function.

FIG. 6 is a flowchart illustrating a method 600 performed by the client application 210 in response to receiving an update notification.

At step 602, the client application retrieves the alert identifier of the alert associated with the update from the received update notification. At step 604, this alert identifier is compared with the alert identifiers in the display cache. If a match is found, the client application 210 determines that the alert associated with the update is currently displayed on a user interface of the client device 202. Alternatively, if a match is not found, the client application 210 determines that the alert associated with the update is not currently displayed on the user interface of the client device 202.

If at step 604, a match is found, the method proceeds to step 606 where the client application 210 determines the action type of the update. In one example, this may be done by inspecting the value of the action type field received in the update notification. If the action type is determined to be a "deleted" action at this step, the method proceeds to step 608, where the record for the corresponding alert is deleted from the display cache and consequently, the alert is removed from the user interface displayed on the client device 202.

In some embodiments, when the alert is removed from the user interface, it may be replaced by a notification informing the client that the alert has been removed from the alert list. In other embodiments, if additional information about the update is available (e.g., information indicating the reason the alert is deleted and/or by whom), the client application can replace the deleted alert with a notification indicating the reason for the deletion (e.g., the notification can state, "Alert

690 acknowledged successfully" or "Alert #690 acknowledged successfully by John Doe"

In some cases, a user may select multiple alerts and acknowledge the multiple alerts in a single action. For example, by selecting an option such as "acknowledge all." In such cases, the update may include identifiers for multiple alerts that need to be deleted from a client application of the user currently displaying those alerts. In such a case, when the client application determines that two or more of the multiple alerts are present in the display cache, the client application may delete the two or more alert records and display a single notification on the user interface in place of the two or more alerts. The notification informing the user, e.g., "7 alerts acknowledge successfully."

In some embodiments, the deleted alert may be removed from the user interface with a visualization—e.g., alert fading and remaining alerts rearranging themselves on the display, the alert moving upwards and the subsequent alerts in the list moving upwards, etc.

Returning to FIG. 6, if at step 606 it is determined that the action type is a "changed" action type, the method proceeds to step 610 where the client application 210 sends a request for update data to the server application 212. The update data request includes e.g., the alert identifier of the changed alert. The update data request may optionally also include an identifier of the action type associated with the alert, and an identifier of the alert type.

In some embodiments, the update data request may also include a query specifying one or more data fields associated with the alert requested by the client application. For example, the client application 210 may request the server application 210 to only communicate data fields of the alert that have been updated in the past few seconds. Alternatively, the client application can request for data fields based on the amount of alert information displayed on the client device 202. For example, the client application 210 can request the server application 212 for summary data fields when the alert is displayed in a list mode and it can request for detail data fields when the alert is displayed in a view mode. In some cases, if the client device is currently displaying a list of search results matching a search query, the search query may also be passed to the server application 210 as part of the update data request such that the server application 210 can pass data fields about notifications that match the search query. For notifications that do not match the search query, the server application 210 may be configured to only pass summary information.

In response to receiving this request, the server application 212 determines whether the user is authorized to access the requested alert. In one example, the server application 212 may maintain a permissions database including a list of permissions associated with each user identifier and/or maintain a list of user identifiers permitted to access each alert maintained by the incident management application. If the user identifier associated with the client application 210 that submitted the update data request is permitted to access the alert, the server application 210 may provide the update data to the client.

Depending on the type of update data request, the server application 212 may forward values of all the data fields related to the alert or selectively communicate values of only requested data fields. For example, if the update data request only requests updated data fields, the server application communicates only the updated field.

At step 612, the client application 210 receives the requested update data from the server application 212 and updates its corresponding display cache 218 and user interface based on the received update data. For example, if the update data indicates that the status of an alert has changed, the client application 210 may change the status of the alert in the cache 218 and the user interface. Similarly, if the priority of an alert has changed, the client application may change the priority of the alert in the cache 218 and the user interface. Ultimately, the change of status of the, change in priority of the alert, or any other update may be displayed as a graphical output on the client device.

Once the update is incorporated, method 600 ends. Returning to step 606, if at this step it is determined that the action type of the alert is an "addition" alert type, the client application 210 determines that there is an error at step 614 and the method 600 ends.

Returning to step 604, if at this step it is determined that there is no match for the alert identifier associated with the update in the display cache 218, the method proceeds to step 616, where the client application 210 checks the action type of the received update. If the action type is a delete action type, the client application 210 determines that an alert that is currently not displayed on the client device 210 is deleted and that this does not affect the alerts displayed on the client device. Accordingly, in this case, the method ends. Similarly, if the action type is determined to be an update action type, the client application 210 determines that an alert that is currently not displayed on the client device 210 has been updated and that this does not affect the alerts displayed on the client device. Accordingly, even in this case, the method 600 ends. Finally, if the action type is determined to be an addition action type at step 618, the method proceeds to step 610, where the client application generates and communicates an update data request to the server.

In this example process, it is assumed that the server application 212 forwards an alert identifier and an action type to the synchronization system as part of the notification update. However, in some examples, the server application 212 may only forward an alert identifier and in other examples, it may not even forward the alert identifier. Instead, it may only forward user identifiers of users that need to be notified that an update is available. In such cases, the client application 210 simply queries the server application 212 for updates. For example, in case only an alert identifier is provided, the client application 210 may compare the received alert identifier with the alert identifiers currently in the display cache. If there is a match, the client application 210 may request the server application 212 to provide the corresponding update. Alternatively, if no information is provided via the update notification, the client application 212 may simply query the server application for updates on all the alert identifiers currently present in the client application's display cache. Although this may be a more resource intensive solution, it is the most secure as no update data is shared with the synchronization system 206 at any stage.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A computer-implemented method for receiving an update generated on a server computing device at a client device, the computer-implemented method comprising:
   displaying, on a user interface of the client device, a graphical output including a content received from the server computing device;
   communicably coupling, by the client device, to a synchronization system that is independent of the server computing device, by submitting to the synchronization system a token used by the client device to access the content from the server computing device;
   receiving by the client device, from the synchronization system, an update notification comprising a unique identifier corresponding to an update to the content;
   in response to receiving the update notification, generating and forwarding an update data request by the client device to the server computing device, the update data request comprising the unique identifier and a user identifier corresponding to a user of the client device;
   receiving by the client device update data from the server computing device, the update data comprising a change to a portion of the content displayed on the user interface; and
   updating by the client device the user interface of the client device to change the portion of the content of the graphical output.

2. The computer-implemented method of claim 1, wherein the update notification further comprises an identifier of a type of update.

3. The computer-implemented method of claim 1, further comprising:
   at the client device, comparing the unique identifier associated with the update with identifiers of items currently displayed on the user interface of the client device;
   upon determining that the unique identifier associated with the update matches an identifier of an item currently displayed on the user interface of the client device, determining an action type associated with the update;
   upon determining that the action type associated with the update is an updated action type, generating and forwarding the update data request to the server computing device; and
   upon determining that the action type associated with the update is a deleted action type, updating the user interface to remove the item from the user interface and forgoing generation and forwarding of the update data request to the server computing device.

4. The computer-implemented method of claim 1, further comprising:
   at the client device, comparing the unique identifier associated with the update with identifiers of items currently displayed on the user interface of the client device;
   upon determining that the unique identifier associated with the update does not match an identifier of an item currently displayed on the user interface of the client device, determining an action type associated with the update; and
   upon determining that the action type associated with the update is an added action type, generating and forwarding the update data request to the server computing device; and
   upon determining that the action type associated with the update is a deleted or updated action type, forgoing generation and forwarding of the update data request to the server computing device.

5. The computer-implemented method of claim 1, further comprising:
   generating and forwarding a synchronization request to the server computing device;
   receiving an update request from the server computing device in response to the synchronization request;
   forwarding the update request to the synchronization system, the synchronization system configured to validate the update request and upon validating the update request, establish a web connection between the synchronization system and the client device.

6. The computer-implemented method of claim 5, wherein the server computing device detects the update, generates the update notification and forwards the update notification to the synchronization system.

7. The computer-implemented method of claim 6, wherein the update notification includes at least one of a customer identifier and a user identifier.

8. The computer-implemented method of claim 7 wherein the synchronization system is configured to compare the user identifier received in the update notification with user identifiers of client devices connected to the synchronization system; and
   upon determining that the user identifier received in the update notification matches the user identifier of one or more client devices, forwarding the update notification to the corresponding client devices.

9. The computer-implemented method of claim 1, wherein the synchronization system utilizes GraphQL for communicating with the server computing device and the client device.

10. A client device for receiving an update generated on a server computing device, the client device comprising:
    a processor; and
    a memory comprising instructions, which when executed by the processor cause the client device to:
       display, on a user interface of the client device, a graphical output including a content received from the server computing device;

communicably couple to a synchronization system that is independent of the server computing device, by submitting to the synchronization system a token used by the client device to access the content from the server computing device;

receive from the synchronization system, an update notification comprising a unique identifier corresponding to an update to the content;

in response to receiving the update notification, generate and forward an update data request to the server computing device, the update data request comprising the token and the unique identifier corresponding to the update;

receive update data from the server computing device, the update data comprising a change to a portion of the content displayed on the user interface; and update the user interface of the client device to change the portion of the content displayed in the user interface.

11. The client device of claim 10, wherein the update notification further comprises an identifier of a type of update.

12. The client device of claim 10, wherein the memory further comprises instructions, which when executed by the processor, cause the client device to:

compare the unique identifier associated with the update with identifiers of items currently displayed on the user interface of the client device;

upon determining that the unique identifier associated with the update matches an identifier of an item currently displayed on the user interface of the client device, determine an action type associated with the update;

upon determining that the action type associated with the update is an updated action type, generate and forward the update data request to the server computing device and upon determining that the action type associated with the update is a deleted action type, update the user interface to remove the item from the user interface.

13. The client device of claim 10, wherein the memory further comprises instructions which when executed by the processor cause the client device to:

compare the unique identifier associated with the update with identifiers of items currently displayed on the user interface of the client device;

upon determining that the unique identifier associated with the update does not match an identifier of an item currently displayed on the user interface of the client device, determine an action type associated with the update; and upon determining that the action type associated with the update is an added action type, generate and forward the update data request to the server computing device and upon determining that the action type associated with the update is a deleted or updated action type, forgo generation and forwarding of the update data request to the server computing device.

14. The client device of claim 10, wherein the memory further comprises instructions which when executed by the processor cause the client device to:

generate and forward a synchronization request to the server computing device;

receive an update request from the server computing device;

forward the update request to the synchronization system, the synchronization system configured to validate the update request and upon validating the update request, establish a web connection between the synchronization system and the client device.

15. The client device of claim 14, wherein the server computing device detects the update, generates the update notification and forwards the update notification to the synchronization system.

16. A non-transitory machine readable medium comprising instructions for receiving an update from a server computing device, the instructions when executed by a processor, cause a client computing device to:

display, on a user interface of the client computing device, a graphical output including a content received from the server computing device;

communicably couple to a synchronization system that is independent of the server by submitting to the synchronization system a token used by the client device to access the content from the server computing device;

receive, from the synchronization system an update notification comprising a unique identifier corresponding to an update to the content;

in response to receiving the update notification, generate and forward an update data request to the server computing device, the update data request comprising the token and the unique identifier corresponding to the update;

receive update data associated with the update to the content from the server computing device, the update data comprising a change to a portion of the content displayed on the user interface; and update the user interface of the computing device to change the graphical output to display the change to the portion of the content.

17. The non-transitory machine readable medium of claim 16, wherein the update notification further comprises an identifier of a type of update.

18. The non-transitory machine readable medium of claim 16, wherein the instructions cause the computing device to:

compare the unique identifier associated with the update with identifiers of items currently displayed on the user interface of the computing device;

upon determining that the unique identifier associated with the update matches an identifier of an item currently displayed on the user interface of the computing device, determine an action type associated with the update;

upon determining that the action type associated with the update is an updated action type, generate and forward the update data request to the server computing device and upon determining that the action type associated with the update is a deleted action type, update the user interface to remove the item from the user interface.

19. The non-transitory machine readable medium of claim 16, further comprising instructions which when executed by the processor cause the computing device to:

compare the unique identifier associated with the update with identifiers of items currently displayed on the user interface of the computing device;

upon determining that the unique identifier associated with the update does not match an identifier of an item currently displayed on the user interface of the computing device, determine an action type associated with the update; and upon determining that the action type associated with the update is an added action type, generate and forward the update data request to the server computing device and upon determining that the action type associated with the update is a deleted or updated action type, forgo generation and forwarding of the update data request to the server computing device.

20. The non-transitory machine readable medium of claim 16, wherein the instructions cause the computing device to:

generate and forward a synchronization request to the server computing device;

receive an update request from the server computing device;

forward the update request to the synchronization system, the synchronization system configured to validate the update request and upon validating the update request, establish a web connection between the synchronization system and the computing device.

* * * * *